(12) United States Patent
White et al.

(10) Patent No.: US 7,969,318 B2
(45) Date of Patent: Jun. 28, 2011

(54) FLOW DETECTOR WITH ALARM FEATURES

(76) Inventors: Matt White, Tampa, FL (US); Cary Frieden, Austin, TX (US)

( * ) Notice: Subject to any disclaimer, the term of this patent is extended or adjusted under 35 U.S.C. 154(b) by 380 days.

(21) Appl. No.: 12/139,503

(22) Filed: Jun. 15, 2008

(65) Prior Publication Data
US 2008/0309503 A1    Dec. 18, 2008

Related U.S. Application Data

(60) Provisional application No. 60/944,357, filed on Jun. 15, 2007.

(51) Int. Cl.
*G08B 17/12* (2006.01)
(52) U.S. Cl. .......... 340/606; 340/610; 340/621
(58) Field of Classification Search .......... 340/606, 340/605, 616, 603, 609, 604, 625, 610, 623, 340/618–621
See application file for complete search history.

(56) References Cited

U.S. PATENT DOCUMENTS

| | | | |
|---|---|---|---|
| D255,102 S | | 5/1980 | Ross |
| 4,761,836 A | * | 8/1988 | Tsutsui et al. .......... 4/420.2 |
| 5,616,243 A | * | 4/1997 | Levy .......... 210/282 |
| 5,891,344 A | * | 4/1999 | Liechti et al. .......... 210/739 |
| 6,317,051 B1 | * | 11/2001 | Cohen .......... 340/603 |
| 6,672,131 B1 | * | 1/2004 | Aldal et al. .......... 73/1.83 |
| 6,802,084 B2 | * | 10/2004 | Ghertner et al. .......... 4/314 |
| 7,032,435 B2 | * | 4/2006 | Hassenflug .......... 73/46 |

OTHER PUBLICATIONS

Nehl, Jim, "Point of use Meter Installation Procedure", Aug. 11, 2005, 9 pages.

* cited by examiner

*Primary Examiner* — Daniel Previl
(74) *Attorney, Agent, or Firm* — Monty Simmons; Simmons Patents

(57) ABSTRACT

The disclosed invention relates to detecting a flow condition in a fluid supply system. The invention is particularly useful for detecting flow in a toilet system. The flow detection device comprises a processor associated with a flow sensor. Predefined flow criteria are stored in a memory associated with said processor. When the processor detects flow through the fluid supply system, the processor uses the flow criteria to characterize the detected flow. If such flow complies with predefined flow conditions, a flow event is noted and an alert is issue. Such alert is configured according to predefined alert-criteria stored in a memory.

20 Claims, 11 Drawing Sheets

FLOW DETECTOR WITH ALARM FEATURES

CLAIM TO PRIORITY

This application claims priority to provisional application 60/944,357 filed on Jun. 15, 2007, the entire contents of which are incorporated herein by this reference for all purposes.

TECHNICAL FIELD OF THE INVENTION

The present invention relates to a flow detector for detecting flow in a fluid system that meets predefined flow criteria. The invention is particularly useful in detecting unwanted flow in a water system and activating an alarm apparatus.

BACKGROUND OF THE INVENTION

Water conversation is a major concern in many areas and is likely to become even more important in the future as populations increase resulting in more water consumption. Practicing water conversation on a regular basis has many benefits including saving money both in the short term and long term. In the short term, water conservation saves the consumer money by reducing a consumer's monthly water utility bill. In the long term, consumers save money by postponing or even preventing the building of new water supply infrastructures thereby reducing the per unit cost (or slowing the increase in cost) of water. In addition, those in charge of water utilities have become increasing militant in the way they promulgate rules regulating water usage and imposing fines for violation thereof.

While there are clearly incentives for home owners to practice water conversation on a regular basis, many households do not have the equipment required to facilitate proper water conversation. For example, leaks resulting in "continuous flow" in a water system may be difficult to detect. Indeed, one of the most costly household wastes of water is a leaky toilet. According to the American Water Works Association (AWWA), toilets account for 45% of all indoor water use in a typical residence. Additionally, it is estimated that 20% of all toilets leak. A serious toilet leak left undetected and uncorrected for any length of time can result in both a huge loss of water and money.

Simple leak detection tests have been developed to determine if a toilet is leaking including placing dye tablets or food coloring in a toilets tank or marking the water line in the toilet bowl after flushing and checking for a drop in water level. Such prior art systems may be effective in detecting certain types of leaks; however, they have their issues. First, for dye tablets, a consumer would typically need to suspect a water leak before using the tablets which means a leak has been occurring over some period of time before a consumer would be prompted into action. Second, dye tablet tests are not very convenient and many consumers may be inclined to simply tolerate small leaks. Third, such tests are not easily applied to other types of leaks such as leaks that may occur in other water paths within a household.

Ghertner et al. teaches electronic based tank leak detection and reporting system in U.S. Pat. No. 6,802,084 (incorporated by this reference for all that it discloses). Ghertner et al. teaches using a timing module to determine the time required to refill a tank. A sensor is used to detect when a lever is actuated to initiate flow to refill such tank. The timing module must also calculate lower and upper threshold values used to define a leak condition. When a leak is detected, local and/or remote alarms may be activated to signal a leak condition.

The Ghertner et al. type systems have their issues as well. First, such a system is not easily applied to other types of leaks that may occur in water paths within the household not associated with a toilet. Second, the Ghertner et al. system must be applied within the toilet. A leak can develop between the supply line and the toilet which would not be detected. Third, the Ghertner et al. system is more complicated to install than is necessary. Fourth, the Ghertner et al. system does not provide a smart alarm activation function to avoid annoying a user at inconvenient times (such as in the middle of night).

What is needed is an automatic electronic monitoring apparatus that can be used to detect an unwanted flow condition in a plurality of applications including a toilet system comprising a smart alarm system that only activates an alarm condition when a predefined condition is detected.

There are some billing systems that do not provide the same level of incentive to practice water conservation as described above. For example, there are multiple family apartment complexes where the tenants do not receive an individual water bill. For such systems, the public utility measures water usage for the entire property at a master meter and bills the property owner based on the master meter reading. The property owner will clearly recover the water consumption costs via rent charged to the tenants; however, the individual tenants do not have the incentive to conserve. Indeed, such a system sets up a "tragedy of the commons" system that gives each tenant the incentive to use at least as much water as his neighbor. In addition, such a system provides very little incentive for a tenant to notify the landlord of a water leak.

What is needed is an automatic electronic monitoring apparatus that can be used to detect unwanted flow in a plurality of applications including a toilet system where the apparatus provides extra incentive to have the leak eliminated.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide an apparatus configured for monitoring a water path for an unwanted flow condition and notifying a user when an unwanted flow condition is detected.

Another general object of the present invention is to provide an apparatus configured for monitoring a water path for an unwanted flow condition and notifying a user when an unwanted flow condition is detected as well as transmitting flow data to a remote location.

Another general object of the present invention is to provide an apparatus configured for monitoring a water path for an unwanted flow condition and notifying a user when an unwanted flow condition is detected as well as transmitting flow data to a remote electronic device configured to automatically perform an action based in part on such flow data.

Another general object of the present invention is to provide an apparatus configured for monitoring a water path for an unwanted flow condition and notifying a user when an unwanted flow condition is detected and providing a user with an increased incentive to have the unwanted flow condition corrected.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
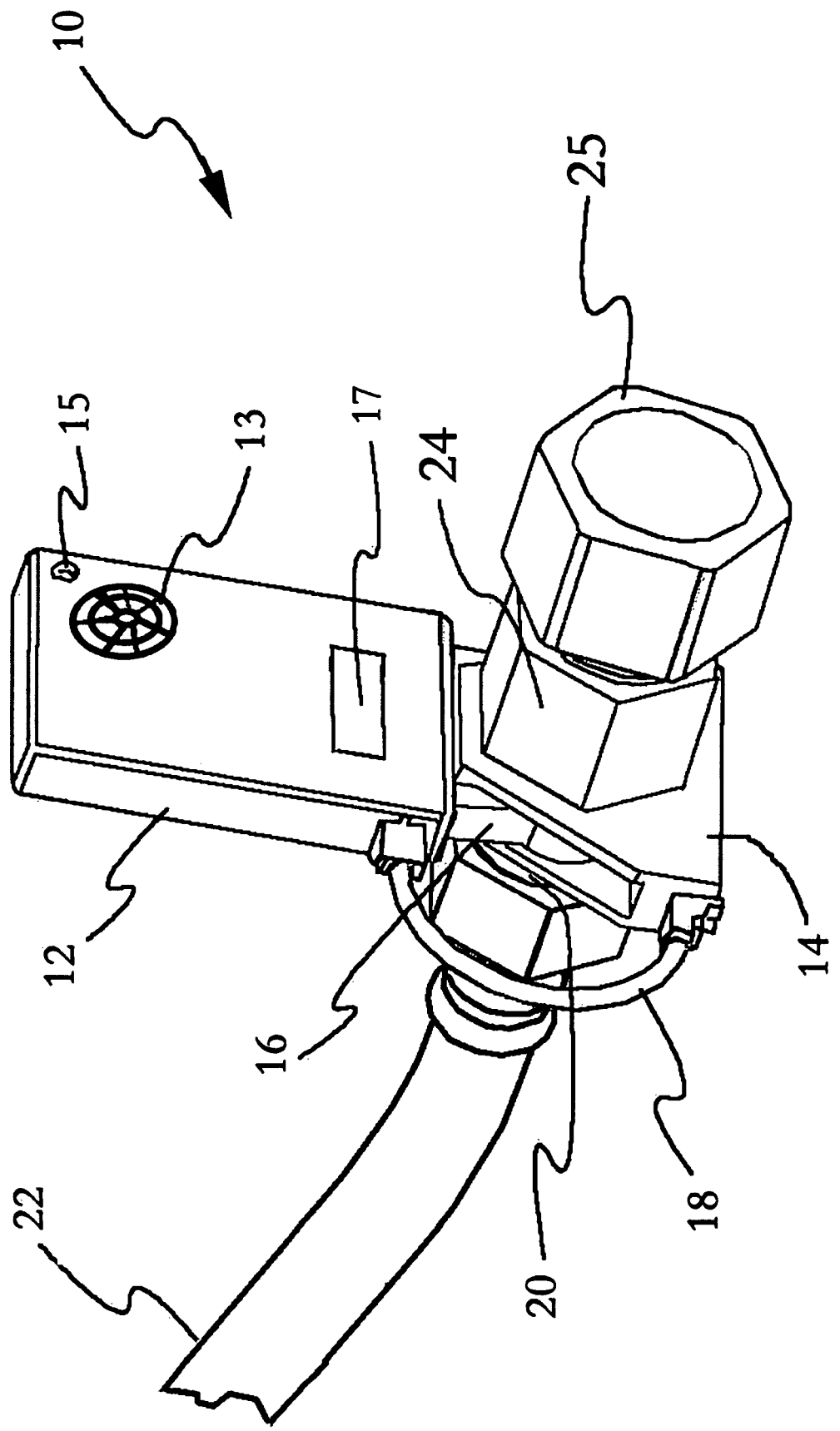
FIG. 1 is a side perspective view of a flow detection apparatus according to one exemplary embodiment of the invention.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "associated" by bringing them together or into relationship with each other in any number of ways including a direct or indirect physical connection that may be a permeate connection, a temporary or releasable connection, a ridged connection or a connection that allows relative movement between the items being associated with each other. Similarly, two or more items are "electrically associated" by bringing them together or into relationship with each other in any number of ways including: (a) a direct, indirect or inductive communication connection, and (b) a direct/indirect or inductive power connection.

This document contains headers. Such headers are "place markers" inserted for the convenience of a reader and have no other meaning or affect the construction of this document in any way and should not to be used in the construction of this document.

While the particulars of the present invention and associated technology may be adapted for use with any application where a fluid is flowing, the examples discussed herein are primarily in the context of detecting water flow in a water system associated with a household.

Figure 2:
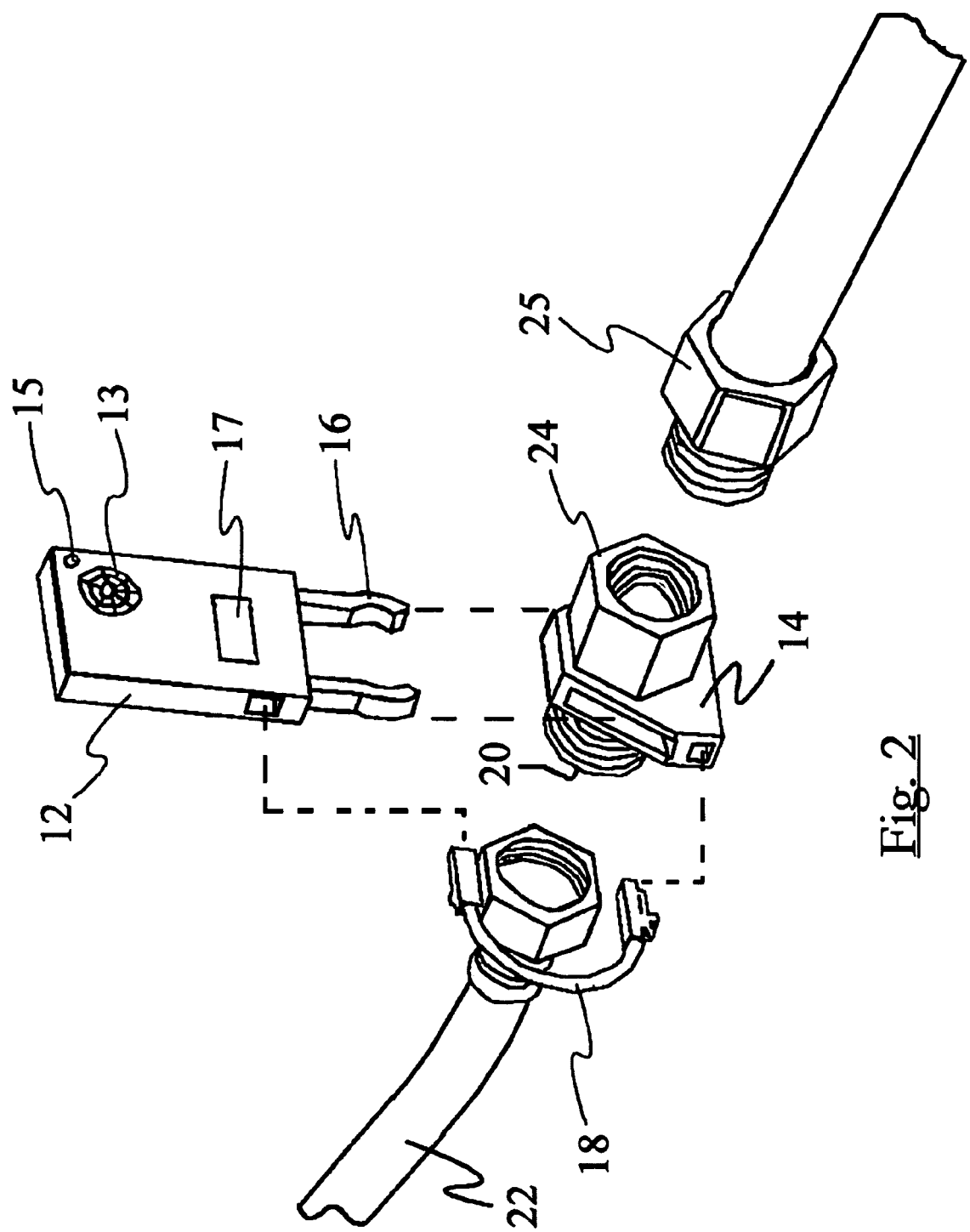
FIG. 2 is an exploded view of the apparatus depicted in FIG. 1.

Referring now to FIG. 1 and FIG. 2, a side perspective view of a flow detection apparatus (FD) (10) according to one exemplary embodiment of the invention is presented. FIG. 2 presents an exploded view of FIG. 1. For the exemplary embodiment of the invention depicted in FIG. 1, FD (10) comprises logic unit (12) mechanically and electrically associated with sensor unit (14). As shown in FIG. 1, logic unit (12) comprises audio output (13), visual output (15), and environmental sensor (17).

The mechanical association between logic unit (12) and sensor unit (14) is achieved via holding clips (16) and the electrical association is achieved via cable (18). It should be appreciated that any number of methods of associating logic unit (12) with sensor unit (14) may be used without departing from the scope and spirit of the invention. In addition, for one alternative embodiment of the invention, logic unit (12) and sensor unit (14) are integrated into a single component.

FD (10) further comprises input coupling (20) in fluid communication with fluid source (22) and output coupling (24) appropriately configured for being associated with a fluid receiver (25). It should be appreciated that input coupling (20), sensor unit (14) and output coupling (24) may be modular components or combined into one integral piece.

For the exemplary embodiment depicted in FIG. 1, fluid source (22) is a water line. Similarly, one possible fluid receiver would be a second water line supplying water to a water consumption device such as a toilet. The components of FD (10) are appropriately configured so that fluid flows from fluid source (22), into input coupling (20), through sensor unit (14), and then through output coupling (24) (in forward flow conditions). For such an embodiment, it should be appreciated that installation requires fluid flow service interruption while FD (10) is associated with flow source.

In the above example, the fluid flows through the FD (10) apparatus. For yet another exemplary embodiment of the invention, FD (10) is configured with a flow sensor that detects flow from a point external to fluid source (22). Stated differently, FD (10) is associated with an exterior surface of fluid source (22). For example, FD (10) may be configured to clamp around fluid source (22) where fluid source (22) is a water line as depicted in FIG. 1.

Figure 3:
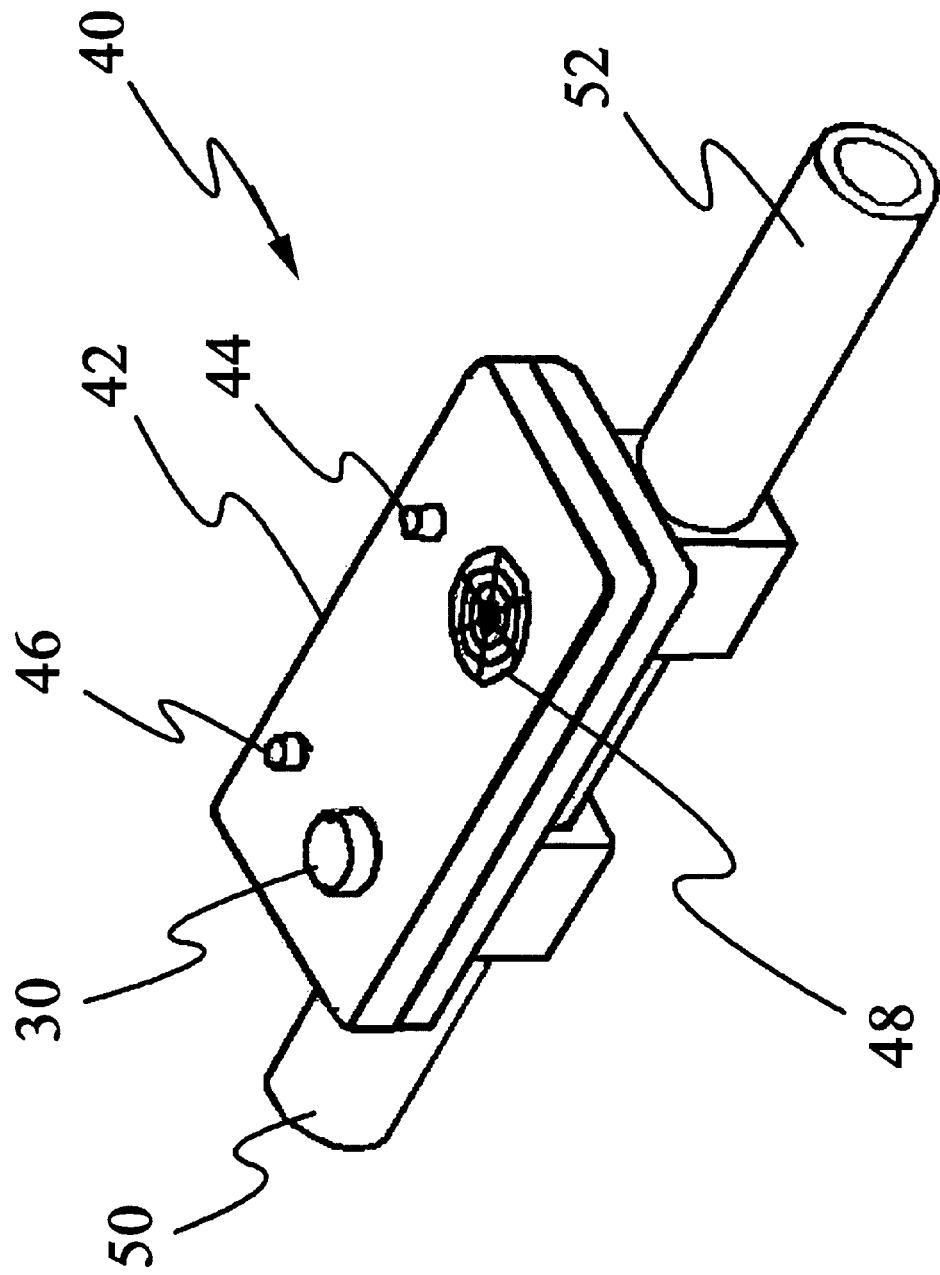
FIG. 3 is a side a side perspective view of a flow detection apparatus according to one exemplary alternative embodiment of the invention.
Figure 4:
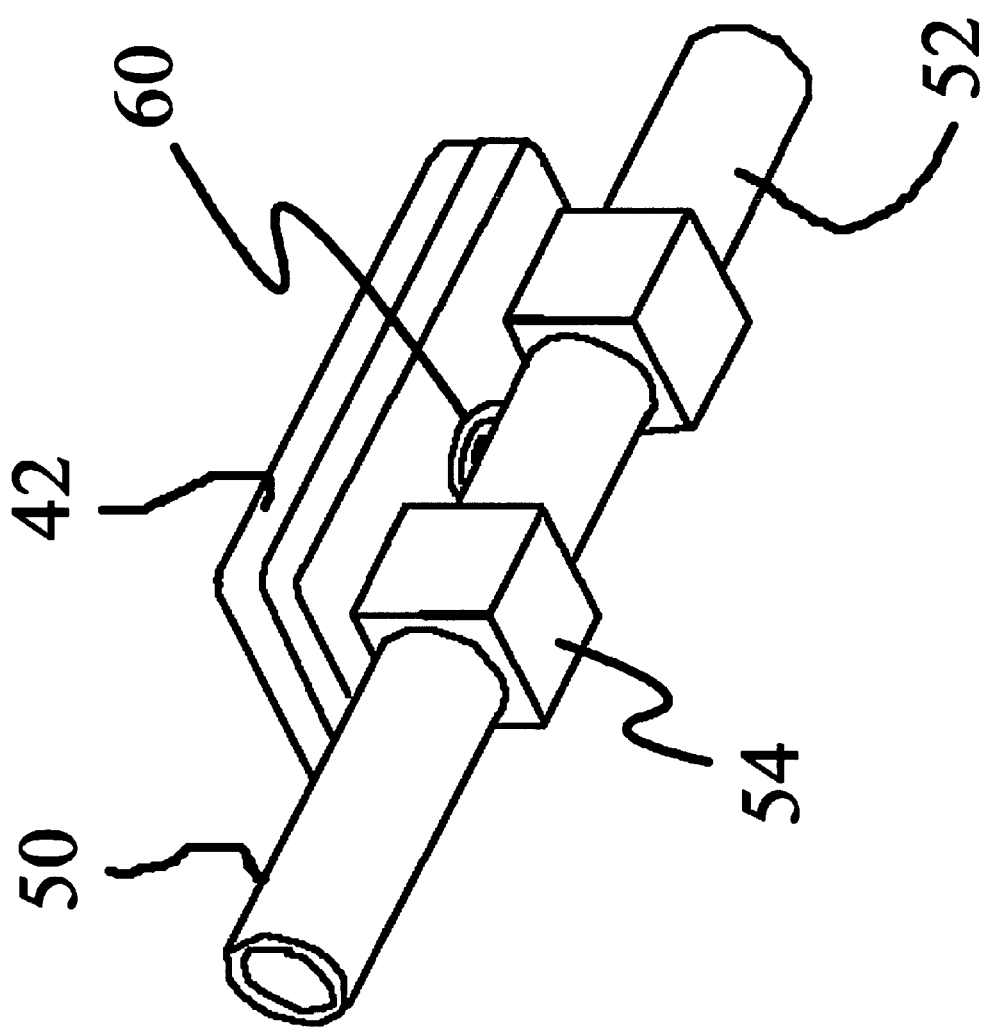
FIG. 4 is a bottom perspective view of the flow detection apparatus depicted in FIG. 3.

Referring now to FIG. 3 and FIG. 4, one exemplary alternative embodiment of the invention is depicted. FD (40) comprises a housing (42) configured to house a controller (70) (described in more detail later). Controller (70) comprises a processor (71) electrically associated with an environment sensor (44), a sound generator (48), a visual signal generator (46), a flow sensor (60), and a reset (30). A memory is also electrically associated with said processor (71). Such memory may be integral to processor (71) or external.

Exemplary technologies for environment sensor (44) include temperature, sound, light, and voltage sensors. For the presently preferred embodiment, the environment sensor (44) is a light sensor. Sound generator (48) may be a piezo speaker. Visual signal generator (46) may be a light emitting diode (LED) and reset (30) may be a push button switch. Flow sensor (60) may be any suitable sensor type such as sound sensors, magnetic sensors (such as Hall effect). For the presently preferred embodiment, flow sensor (60) is a sound sensor such as a microphone. For this embodiment of the invention, sound device (60) is configured to listen for the sound of fluid flowing through the fluid source (50). Such functionality will be described in more detail later.

As shown in FIG. 4, FD (40) comprises arms (54) for mechanically associating FD (40) to a fluid source (such as fluid source (50)) so that flow sensor (60) is in close proximity to fluid source (50). For this embodiment, arms (54) define a one piece structure appropriately sized for being associated with flow source (50).

The ends of fluid delivery structure (51) (a pipe for this example) may be associated with fittings to make installation of the FD (40) device easier. For this embodiment of FD (40), fluid delivery structure (51) is configured for being inserted into a flow path. For such an embodiment, it will be appreciated that installation requires fluid flow service interruption while FD (40) is associated with flow source (50).

Figure 5:
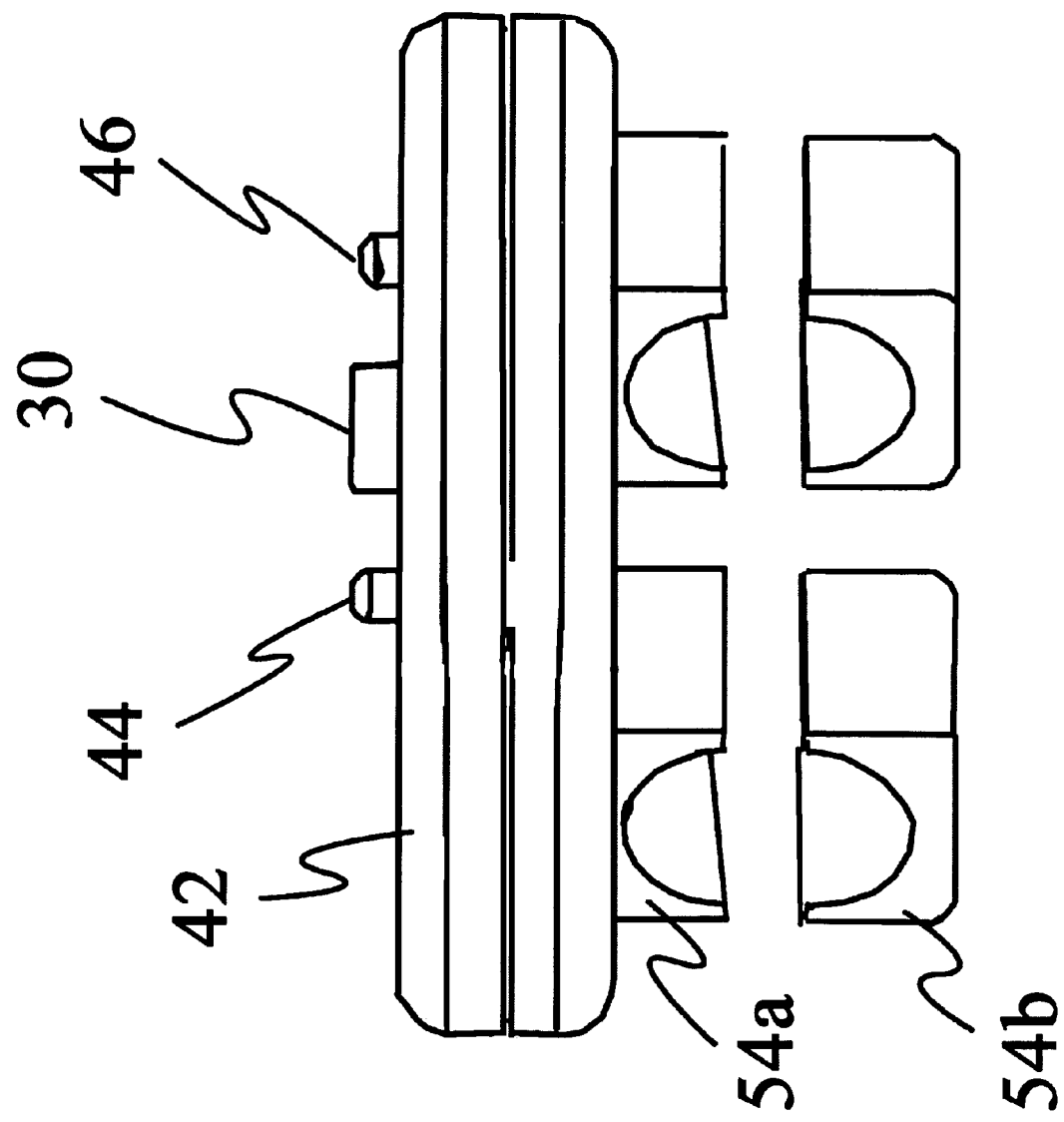
FIG. 5 is a side perspective view of an alternative view of the flow detection apparatus depicted in FIG. 3.

Referring now to FIG. 5, an alternative embodiment of the invention is disclosed where arms (54) define a two piece structure. Arms (54a) are mechanically associated with housing (42) or are an integral component of housing (42). Arms (54b) are configured for being removably associated with arms (54a) to allow the FD (40) device to be mechanically associated with a flow source without the need to interrupt the fluid delivery service.

Logic/Control Units

Figure 6:
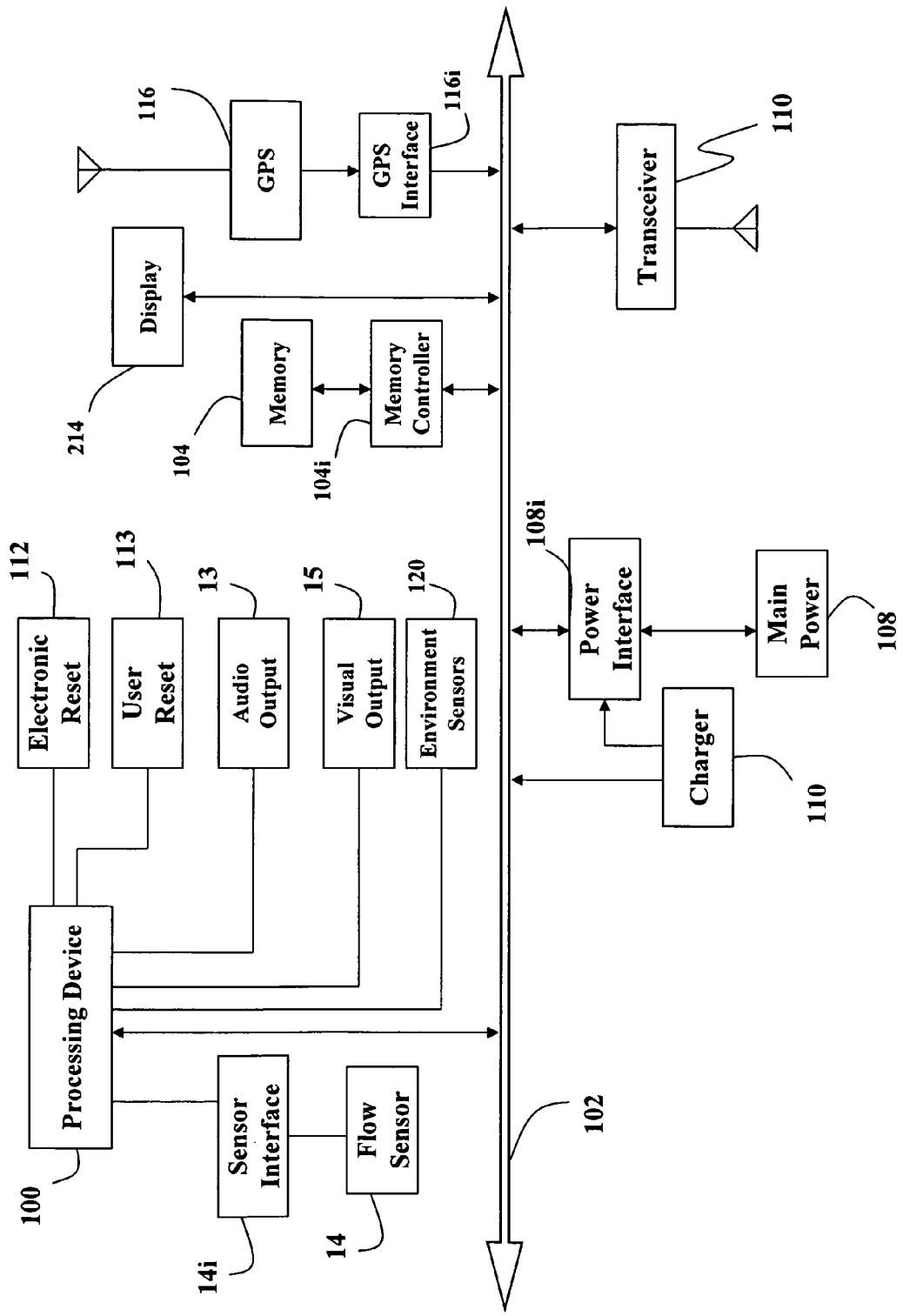
FIG. 6 is one exemplary block diagram representation of logic unit (12)

Referring now to FIG. 6, attention will now be directed more specifically to one exemplary embodiment of logic unit (12). Initially it should be appreciated that FIG. 6 presents just one of a plurality of methods of electrically associating the various electronic components to achieve the features desired for logic unit (12). For example, FIG. 6 presents the use of a common buss (102) for electrically associating the various components. It should be appreciated that embodiments where certain devices are directly electrically associated with a microcontroller without the use of a buss fall within the scope of the invention. In addition, various embodiments of logic unit (12) may include all the features presented in FIG. 3, only a subset of subset of such features as well as features not specifically presented in FIG. 3.

For the presently preferred embodiment, logic unit (12) is preferably completely encapsulated in a potting material to prevent water contamination. Additionally, any wired connections (i.e. cable (18)) between logic unit (12) and external devices, such as sensor unit (14) are preferably achieved using a non-wicking wiring system.

The functional blocks of FIG. 6 represent ASSPs (Application Specific Standard Product), Complex Programmable Logic Devices (CPLD), ASICs (application specific integrated circuit), microprocessors, or PICs. In addition, one or more functional blocks may be integrated into a single device or chip sets such as ASSP chip sets. For example, one or more of the various interfaces described below may be integrated into (or have its described functions performed by) processing device (100).

Manufactures of suitable ASSP devices include Motorola, and Texas Instruments. While most of the functions are preferably performed by ASSP chip sets, Complex Programmable Logic Devices (CPLD) may be used to interface the various ASSP blocks to system buss (102) allowing one system component to interface with another component. Manufactures of suitable CPLD devices include Lattice's (ispMACH 4000 family) and (Altera's MAX 7000-series CPLD).

For the presently preferred embodiment of the invention, processing device (100) is configured for controlling the various features of logic unit (12) including the data management system (including flow data), communication system, power management system, alarm system, and environmental sensor system. Processing device (100) is preferably a simple PIC (such as the ones manufactured by MicroChip). Other technologies that may be used include ASICs (application specific integrated circuit) and ASSPs (application specific standard product). Processing device (100) may comprise onboard ROM, RAM, EPROM type memories. As shown in FIG. 6, processing device (100) is electrically associated with buss (102).

Buss (102) is configured for providing a communication path between the various electronic devices electrically associated with buss (102). For example, Buss (102) is configured for transferring data signals between processing device (100) and other electronic devices electrically associated with buss (102). For the preferred embodiment, bus (102) also comprises electrical paths for transferring power between main power (108), and EM energy converter (not shown) and other electronic devices electrically associated with buss (102). Buss (102) my further comprise a data port and or a power port configured for supplying/receiving power or providing a communication path to electronic devices electrically associated with such port (such as a programmer).

Memory (104) is electrically associated with buss (102) via memory controller (104i). Memory (104) may be any type of memory suitable for storing data such as flash memory, SRAM memory, hard drive memory, as well as other types of memories. Volatile memory continuously connected to a power source may be used, although, for the preferred embodiment, memory (104) is nonvolatile memory. Memory (104) may be used for storing all types of data including application programs, sound data, customer information, sensor data, threshold data, and warning-criteria. Memory (104) is electrically associated with processing device (100) via memory controller (104i) and buss (102). For one possible alternative embodiment, memory (104) and memory interface (104i) is integral to processing device (100)

Optional Display (114) is configured for displaying the various system data received or generated by devices electrically associated with buss (102). Display (114) is electrically associated with buss (102) and may include technology for providing a customizable touch screen controller configured for control and decoding functions for display (114). For the preferred embodiment display (114) is a LCD display. Additionally, for one embodiment, display (114) comprises a "memory" configured to provide an image when power is removed from the display. For this embodiment, an image is written on the LCD display and when power is removed, the display will retain the image virtually indefinitely. Such a LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed.

For one alternative embodiment of the invention, logic unit (12) comprises transceiver (110) comprising a relatively low power transmitter that transmits a data signal in an unlicensed frequency band. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. Low power transceiver (110) is configured for short range communication with other suitably configured devices.

Other embodiments include a relatively longer range transmitter comprising any number of well known technologies for wireless communications transmitting at any legal power level. For example, transceiver (110) may be configured to communicate over GPRS, GSM, GPRS, 3G, and EDGE enabled networks as well as WAP networks.

Logic unit (12) may further be configured for storing and/or generating location data. For embodiments that generate location data, logic unit (12) includes a GPS device (116) electrically associated with processing device (100) via buss (102) and GSP Interface (116i). GPS (116) is one embodiment of a position-finder electrically associated with a processing device where GPS (116) is configured to generate position-data for the location of FD (10). Alternatively, logic unit (12) may be programmed with location data.

The attributes of exemplary main power (108) are now considered. For the presently preferred embodiment, main power (108) is a long life depletable power source such as a Li Ion battery. For such embodiment, main power (208) comprises at least one long life rechargeable Li Ion battery such as the ones manufactured by A123 Systems®.

Extending the life of main power (108) or extending the time between recharging is one design concern addressed by power interface (108i). Power Interface (108i) is configured to perform power management functions for the system as well as monitor the status of main power (108) and report such status to devices electrically associated with buss (102) (such as processing device (100)). Power interface (108i) dynamically addresses power management issues by selectively powering down unutilized devices. For the Preferred embodiment, power interface (108i) is a CPLD that generates chip-select signals and powers down the various ASSPs as desired. Alternatively, processing device (100) may perform such power management functions.

Electronic reset (112) is electrically associated with processing device (100) and is configured to notify processing device (100) to perform a predefined reset function. For one embodiment of the invention, electronic reset (112) is a magnetic switch such as a reed switch, Hall Effect switch, or weigand wire. When a magnetic field is placed in close proximity of electronic reset (112) a reset signal is generated. One method of activating electronic reset (112) is to place a magnet in close proximity to electronic reset (112).

Similarly, user reset (113) is electrically associated with processing device (100) and is configured to notify processing device (100) to perform a predefined user reset function. For one embodiment of the invention, user reset (113) is a simple mechanical button switch.

Attention now is directed to audio output (13) and visual output (15). For the preferred embodiment, audio output (13) comprises a sound generator such as a sound transducer. Audio output (13) is configured for generating sound waves to attract the attention of a user. For example, audio output (13) may be configured to emit a beeping sound.

For the presently preferred embodiment, visual output (15) comprises a light generator such as a low power LED. Visual output (15) is configured for generating a visual signal to attract the attention of a user. Processing device (100) may be configured to use either or both outputs to in an attempt to attract the attention of a user.

Environmental Sensor (120) is electrically associated with processing device (100). For the presently preferred embodiment, environment sensor (120) is a light sensor configured to generate a signal based on the amount of light striking the sensor. Such sensor signal is provided to processing device (100) which may be configured to perform or not perform predefined functions based on such sensor signal. For example, processing device (100) may be configured not to activate audio output (13) until sufficient light is striking environment sensor (120). Environmental sensor (120) may represent a plurality of sensors configured to detect different phenomena. Suitable sensor technologies include light sensors, temperature sensors, and sound sensors.

Sensor unit (14) is now considered. Sensor Unit (14) is configured for generating flow-data in response to detecting flow from fluid source (22). Such flow data may be represented by the generation of a pulse or any other suitable electronic signal. For the exemplary embodiment depicted in FIG. 1, one suitable flow sensor is the i-meter manufactured by MeterLogic. When sensor unit (14) detects flow through sensor unit (14) a pulse is generated. For the configuration shown in FIG. 1, flow data is transmitted to logic unit (12) via cable (18).

For an alternative FD (10) embodiment that detects fluid from fluid source (22) from a point exterior to fluid source (22), a second type of flow sensor is used. For such a configuration, sensor unit (14) and logic unit (12) are preferably integrated into a signal unit that is configured to be associated with an external surface of fluid source (22). When fluid source (22) is a water pipe, FD (10) is preferably configured to clamp around such water pipe. One suitable flow sensor for such embodiment is an acoustic sensor. There are many commercially available acoustic sensors known and understood by those skilled in the art, and a detailed explanation thereof is not necessary for purposes of describing the method and system according to the present invention.

Figure 7:
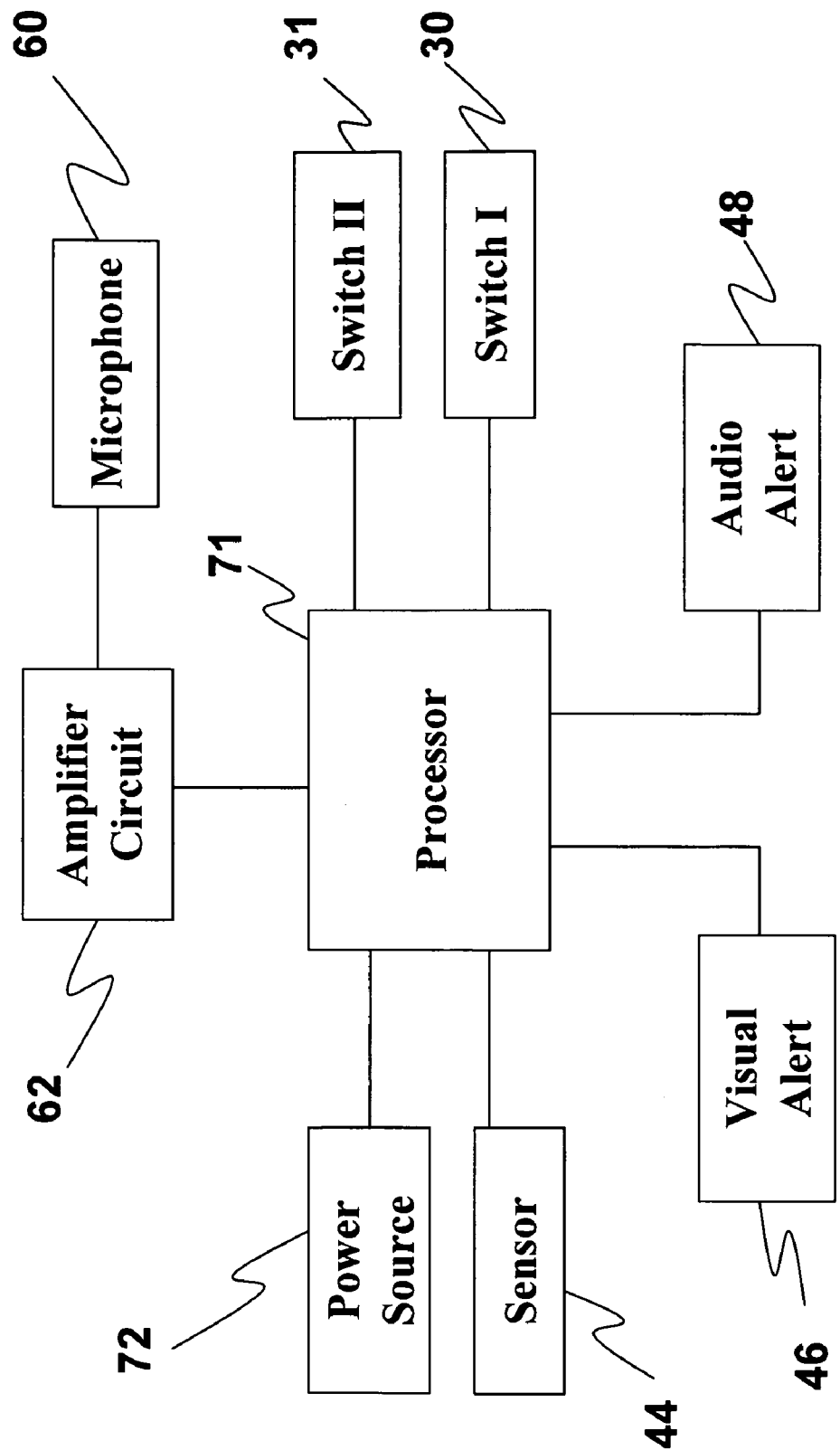
FIG. 7 is an exemplary block diagram representation of a flow detection device controller according to one exemplary embodiment of the invention.

Referring now to FIG. 7, an alternative embodiment of the invention using an acoustic sensor is represented in block diagram form. Controller (70) comprises processor (71) electrically associated with various components of the invention including an environment sensor (44), a sound generator (48), a visual signal generator (46), a flow sensor (60), a user reset (30), an owner reset (31) and power source (72).

Processor (71) may comprise any of the technologies described earlier. For the preferred embodiment, processor (71) is a microcontroller such as the MSP430×2013 manufactured by Texas Instruments. Processor (71) is programmable and may be configured for interacting with numerous devices.

As mentioned earlier, for the preferred embodiment, environment sensor (44) is a sensor for detecting light. One example of a suitable light sensor is a light dependent resistor (LDR) that measures light level and generates an analog signal that is measured an A/D converter within processor (71).

The flow sensor (60) is a microphone electronically associated with processor (71) via a power amplifier. Suitable power amplifiers include the LM386 manufactured by National Semiconductor. Such a power amplifier designed for use in low voltage consumer applications. The gain is internally set to 20 to keep external part count low, but the addition of an external resistor and capacitor between pins 1 and 8 will increase the gain to any value from 20 to 200. The inputs are ground referenced while the output automatically biases to one-half the supply voltage.

Sound generator (48) is preferably a piezoelectric speaker or transducer. One suitable piezoelectric device is the MLS series of multilayer ceramic piezoelectric speakers manufactured by Taiyo Yuden. Such technologies eliminate the need for a magnet that all standard dynamic speakers require for operation, and allow the device to be manufactured to a standard thickness of only 0.7 mm. However, larger piezoelectric devices may be used. Sound generator (48) is electrically associated with processor (71) so that when processor (71) determines an audio based alarm should be issued, processor (71) sends the appropriate signal to sound generator (48) which generates a sound based alert signal.

Visual signal generator (46) is any suitable device for generating a visual alert signal such as light emitting diodes (LED) and low power liquid crystal displays (LCD). For the preferred embodiment, visual signal generator (46) is a low power consumption light emitting diode (LED). Visual signal generator (46) is suitably associated with processor (71) to allow processor (71) to issue visual alerts when necessary.

Alert Modes

Before describing the reset switches used in the FD (40) configuration, the alert modes are considered. By way of example, a "user" may be a tenant that rents an apartment while the "owner" would be the apartment owner. For some apartments, water is included in the rent and not individually metered. Under such conditions (user/owner not the same), a user may not have incentive to correct an unwanted flow condition (such as a leaking toilet) or even notify an owner of such a condition. Such a user may simply keep resetting an alert signal.

Alert Mode-1 is configured for user/owner situations. For Alert Mode-1, a "flow event" is (a) the detection of fluid flow (b) during a predefined flow interval, for (c) a predefined number of consecutive flow-intervals (i.e. the flow-period). Such a mode-1 flow event is one example of a periodic flow event. For example, let the flow-interval equal 1 hour and the number of consecutive flow intervals equal 24. For such an example, if processor (71) detects flow every hour for a 24 hour period, (i.e. 24 consecutive flow intervals), a mode 1 "flow event" occurs.

For a mode-1 flow event, processor (71) accesses the mode-1 flow alert-criteria and activates the appropriate alert devices as required. Exemplary alert-mode-1 alert criteria may be: (1) activate a sound alert generator using predefined sound-alert-criteria; (2) activate a visual alert generator using predefined visual-alert-criteria; and (3) alert-enable status. Example alert-mode-1 alert-criteria includes: fast beeping (sound alert criteria); fast continuous blinking (visual alert criteria); and generate alerts only when there is enough light detected (alert-enable status). Thus, with a mode-1 event is detected, visual signal generator (46) blinks rapidly and sound generator (48) beeps rapidly when there is enough light around FD (40). Alternatively, mode-1 alert criteria may require a dark room before issuing an alert.

For a mode-1 event, a user may use user reset (30) a predefined number of times (user-resets) to reset the mode-1 alert. After the maximum number of user-resets has been used, an owner reset is required to reset an alert or the flow condition that caused the mode-1 alert must be corrected.

For one embodiment, pushing user reset (30) resets the alert and adds 1 to the mode-1 alert counter. If no mode-1 alert occurs during the next flow-period, the mode-1 alert counter value is reset and no alert is issued.

User reset (30) and owner reset (31) are now considered. For the present embodiment, user reset (30) is a simple button style switch that allows a user to reset controller (70) to suspend and/or cancel an alert. For example, when processor (71) issues an audio based alert signal, a user may press user reset (30) to suspend or reset such alert. In addition, more than one type of alert may be issued such as a visual alert and a sound based alert. Pressing user reset (30) may suspend/reset all or only some of the issued alerts.

Optional owner reset (31) may be included in some configurations. Activating owner reset (31) completely resets the alerts and counters values. For embodiments that include an owner reset (31), such reset is preferably a magnetic sensor or switch that is positioned within housing (42) in a known location but not visible to a user. Suitable magnetic switches include reed switches, Hall Effect sensors, or weigand wires. An owner could then activate owner reset (31) by placing a magnetic device (such as a magnet) in the near proximity of owner reset (31) thereby activating the switch and resetting the alert.

Flow Detection and Alarm Conditions

Figure 8:
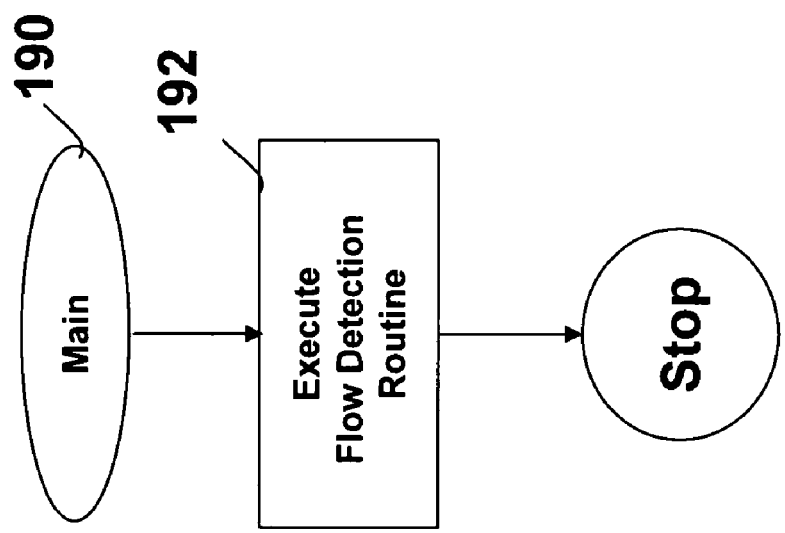
FIG. 8 is a flow chart diagram of one exemplary Main Routine.
Figure 9:
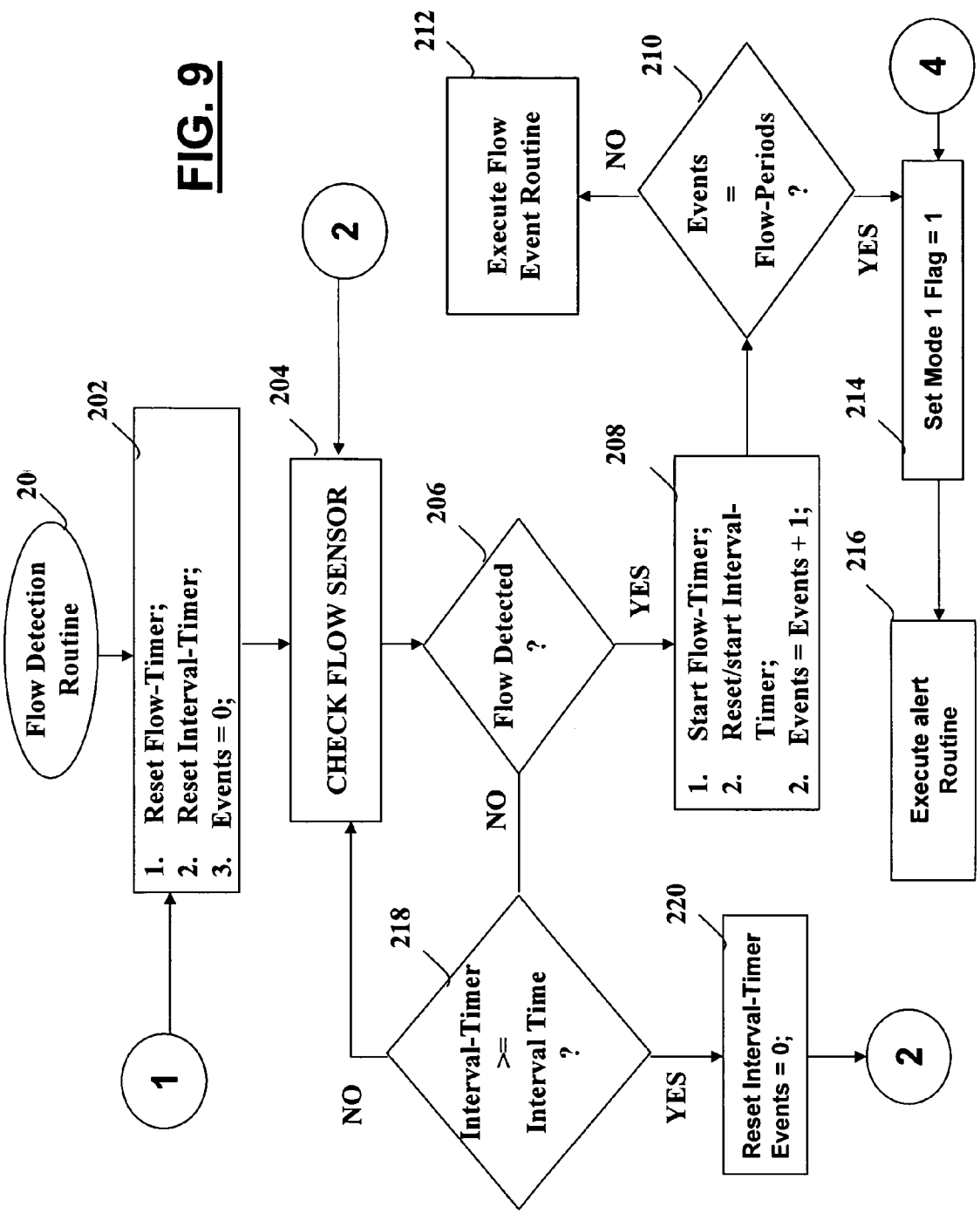
FIG. 9 is a flow chart diagram of one exemplary Flow Detection Routine.
Figure 10:
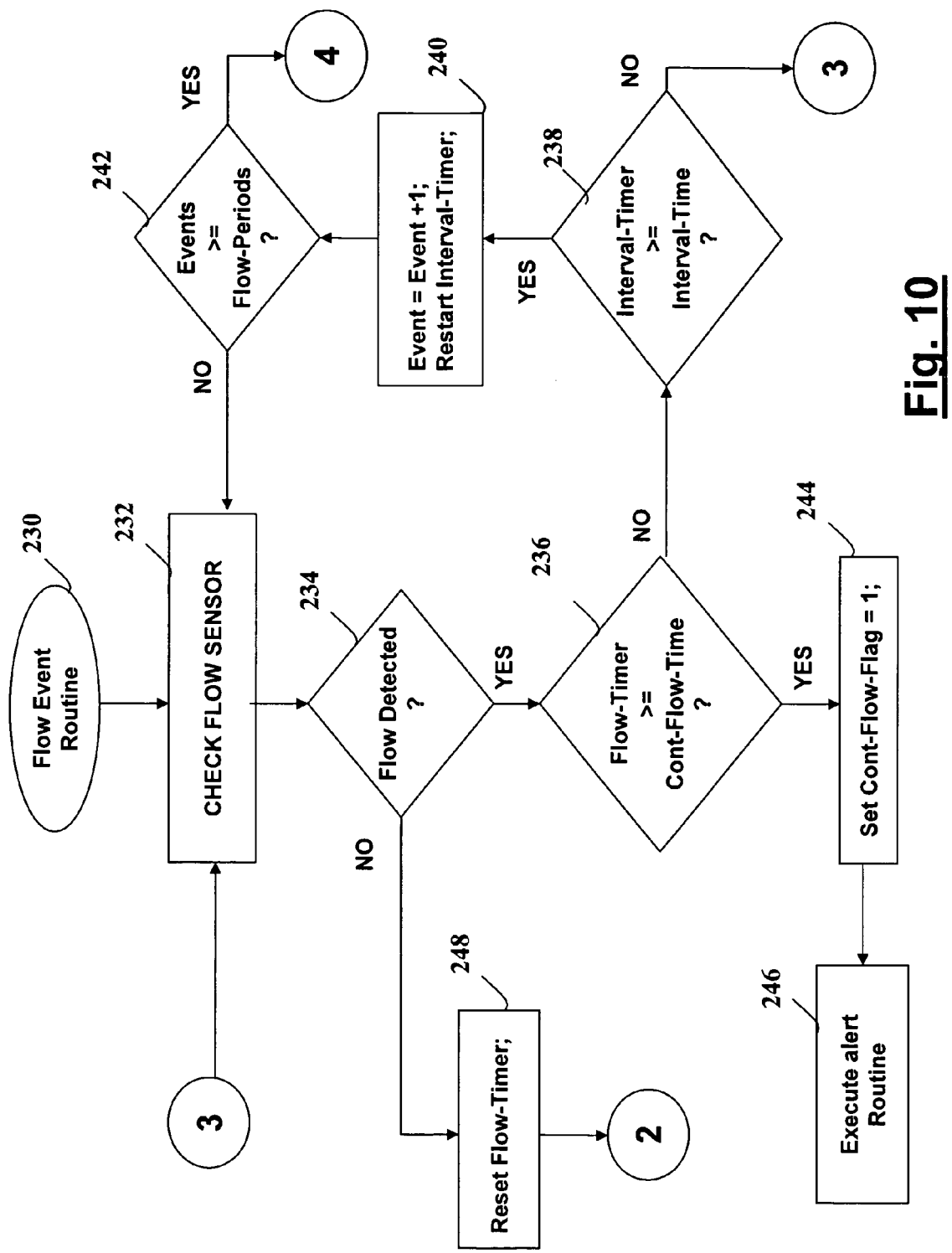
FIG. 10 is a flow chart diagram of one exemplary Flow Event routine.

Referring now to FIG. 8, FIG. 9 and FIG. 10, exemplary flow detection and alarm algorithms for FD (10) and FD (40) configurations are now considered.

The Main algorithm depicted in FIG. 8 starts at step (190) and proceeds to step (192) where the Flow Detection Routine presented in FIG. 9 is called or executed. Upon program return from the Flow Detection Routine, program execution stops.

Before discussing the flow detection routine, it may prove useful to describe some of the variables that are used by the flow detection routine. To better understand such variables, a discussion of how one might characterize flow may also prove useful. For this example, a residential house is the environment and the fluid is water and the FD device is associated with a water line.

It should be appreciated that a FD device may be associated with the main supply line for a residential house, the supply line for a water heater, the supply line for a sink, the supply line for a toilet, or any other water supply line used in a home setting.

With regards to water consumption and water flow times, one would expect the longest water flow-times in the main supply line to a house as the main supply line supplies water to the entire house. A shower supply line and water heater supply line may have the next longest flow-times, then dish washers and washing machines, and finally sinks and toilets would likely see the shortest flow-times.

It is unlikely that a residential customer will use water continuously for two hour. Thus, using such an assumption, if the main supply line for a house has continuous water flow for more than two hours, one may assume there is a leak in the water supply system. Such an assumption may prove wrong (i.e. a customer filling up a swimming pool) but more times than not such assumption will be correct.

For a water heater, it is unlikely that a water heater supply line will have continuous flow for more than 30 minutes. For a toilet, continuous flow should not exceed 7 minutes. That said, the continuous-flow-time should be a variable that is either set by a user as needed or an owner based on the location where the FD is to be used. If the flow detection routine detects continuous flow for longer than the continuous-flow-time, a leak alert is issued.

The above described continuous flow leak is relatively easy to detect. There are leaks that are not so easy to detect.

Consider a toilet that has a tank that is slowly leaking into the toilet bowl. When the water level in such a tank drops low enough, the tank is automatically supplied with replacement water and the process starts over again. For example, assume a leaking toilet is flushed and the tank is refilled with water. The tank seal is bad and is leaking water into the toilet bowl. About five minutes after the flush, the water level in the tank drops low enough to activate the water supply line to refill the tank and the process starts over. Thus, every five minutes (6 times an hour) there is a flow condition in the toilet supply line. Such flow is not "continuous" but it does represent a "leak" condition.

Such is an unlikely flow condition for a toilet. In addition, it is very unlikely that a toilet will be used every hour in a twenty-four hour period. Thus, to detect such a leak, one might use a "flow-period" variable and set it twenty-four (hours), use a "flow-interval" variable and set it to 1 hour, and use an "events" variable and set it to any number desired (one for the above example). For such a configuration, if water flow is detected in a toilet supply line at least one time an hour for a twenty-four hour period, a leak alert is issued.

It should be appreciated that checking for continuous flow may require more resources than checking for a leaking toilet condition (for example) as described above. Thus, while the FD (10) or FD (40) devices are preferably configured to detect both events, some embodiments may include only one type of detection function.

FIG. 9 presents one exemplary Flow Detection Routine algorithm which begins at step (200). At step (202), a flow-timer is reset, a interval-timer is reset and events is set to zero. Flow-timer is used to track the continuous flow time. The interval-timer is used to track a time interval for a mode 1 alarm. For example, if the interval time is 60 minutes, the variable "interval-time" will be 60 minutes. At step (204) the flow sensor is checked. IF no flow is detected, the interval-timer value is examined to see if it matches or exceeds the interval-time variable. On the first pass into the routine, the interval-time is zero and program control passes back to step (204). If flow is detected at step (204), program control passes to step (208) where the flow-timer is started, the interval time is reset and started and the variable "events" in incremented. The "events" variable records the number of consecutive intervals that flow is detected. Program control then checks to see if "events" is equal to "flow-periods." Flow-periods is a variable that is set to the number of consecutive intervals flow is to be detected before a mode 1 alert is issued. If "events" is equal to "flow-periods", a mode 1 event has occurred and such is represented by setting "mode 1 flag" to 1. If at step (210) "events" is not equal to flow-periods, program control is passed to step (212) and the "Flow Event Routine" is executed.

The flow event routine starts at step (230) where the first step is to again check for flow at step (232). If no flow is detected, the flow-timer is reset at step (248) and program control passes back to step (203) where the flow sensor is checked again. IF not flow is detected, the interval-timer is check to see if it is greater than or equal to the variable interval time. Generally speaking, if the interval-timer ever reaches the "interval-time" variable value, no mode 1 flow condition has occurred and monitoring for a mode 1 flow event is started over by resetting the variable "events" to zero.

IF at step (232) flow is detected, program control passes to step (236) where the flow-timer value is compared to the cont-flow-time variable (continuous flow time). If the flow timer value reaches the cont-flow-time variable value, a continuous flow condition has been detected and program control passes to step (244) where a cont-flow-flag is set to 1. Program control then passes to step 246 where the "Alarm Routine" is executed.

If the flow timer value has not reached the cont-flow-time variable value, program control passes to step (238) where the interval-timer value is compared to the interval-time variable value. If the interval-timer value has not reached or exceeded the interval-time variable value, program control passes back to step (232). If the interval-timer value has reached or exceeded the interval-time variable value, program control passes to step (240) where the variable "event" is incremented and the interval timer restarted. Program control then passes to step (242) where the "event" variable value is compared to the flow-period value. If the value of the "event" variable is greater than or equal to the flow-periods value, a mode 1 flow condition has been detected. Program control passes back to step (214) where the mode 1 flag is set to 1 and then the alarm routine is executed.

If at step (242) the value of the "event" variable is less than the flow-periods value, program passes back to step (232) where the flow sensor is again checked.

Basically, there are three outcomes for the above routines. First, the FD may not detect a flow condition that meets predefined flow criteria. Second, a continuous flow condition may be detected as defined by the cont-flow-time variable predefined by a user or owner and a continuous flow alert may be issued. Third, a mode 1 flow condition may be detected where a flow event has been detected for a predefined number ("events") of consecutive flow intervals (flow-interval value) for a predefined flow period (flow-period value).

Alarm Routine

Figure 11:
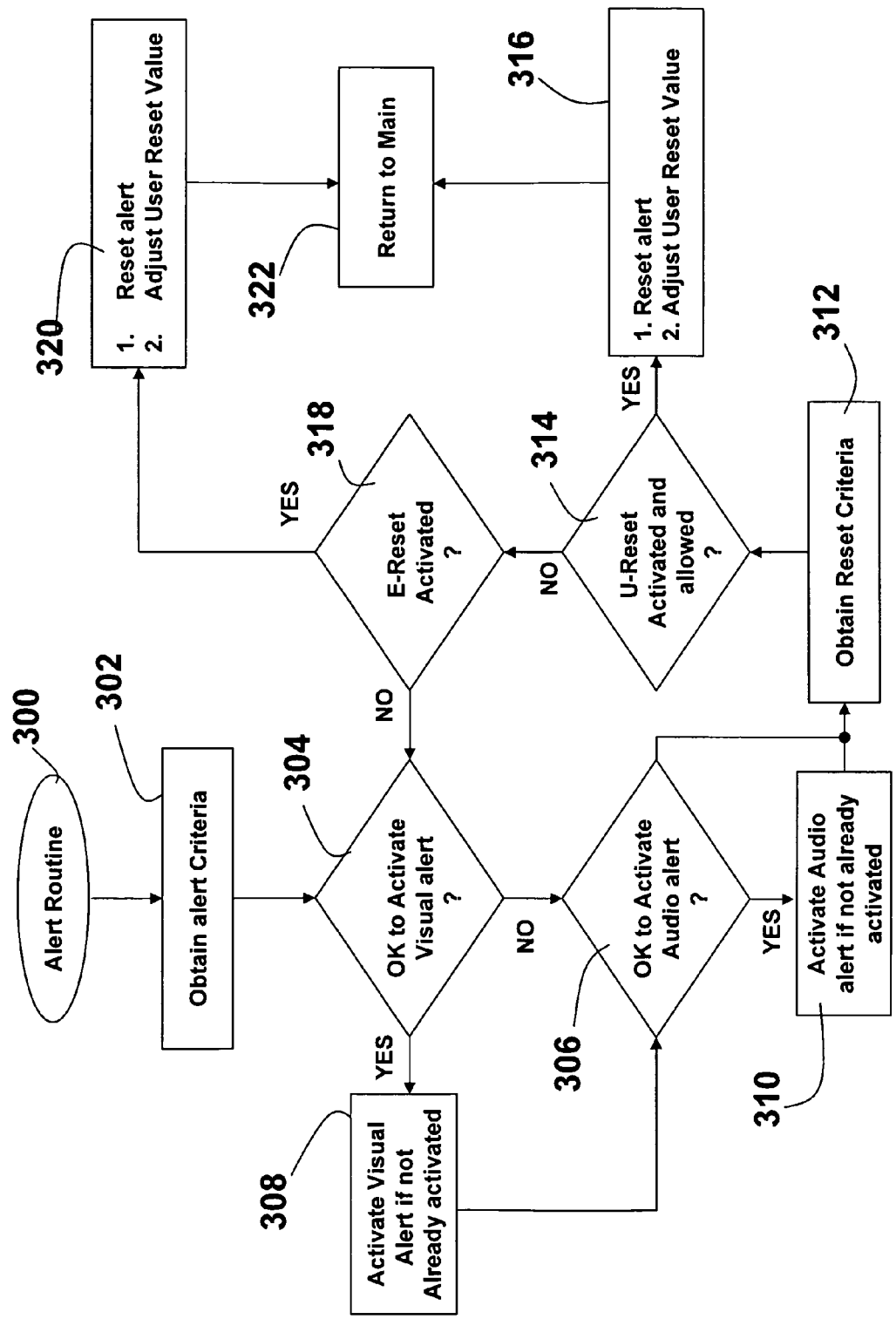
FIG. 11 is a flow chart diagram of one exemplary Alert Routine.

FIG. 11 presents one exemplary alarm/alert routine which starts at step (300). At step (302), the alert-criteria are retrieved for the alert(s) to be issued. If such alert criteria require external data, such data is retrieved. Any suitable information may be included in such external data such as time data, sensor data, and status data (e.g. battery status data). For example, there may be certain times during a day that the acoustic based alert should not be activated. Time data and a user defined variable (e.g. a time interval such as 11:00 pm-6:00 am) may be used for such purposes. Alternatively, light sensor data may be used instead of time data as one may not wish to activate the acoustic alarm at night (when it is dark).

In addition, as noted above "alert styles" may be part of the alert criteria. Exemplary alert-mode-1 alert criteria may be to: (1) activate a sound alert generator using a predefined sound configuration; (2) activate a visual alert generator using a predefined visual alert configuration; and (3) determine alert-enable status. Example alert-mode-1 alert-criteria includes: fast beeping (sound alert criteria); fast continuous blinking (visual alert criteria); and generate alerts only when there is enough light detected (alert-enable status). Thus, with a mode-1 event is detected, visual signal generator (46) blinks rapidly and sound generator (48) beeps rapidly when there is enough light around FD (40). Alternatively, mode-1 alert criteria may require a dark room before issuing an alert. Similarly, a stored voice message may be stored in memory that is to be played as required.

At step (304), the program determines if a visual alert may be activated. If the visual alert may not be activated, program control passes to decision step (306). If the visual alert may be activated, program control passes to step (308) where the visual alert is activated after which program control passes to step (306).

At step (306), the program determines if the audio alert may be activated. If the audio alert may be activated, program control passes to decision step (310) where the audio alert is activated after which program control passes to step (312). If the audio alert may not be activated, program control passes directly to decision step (312).

At step (312), alert reset criteria are obtained as the alert reset criteria may be different for different installation environments and alerts as previously described. At step (314), the program determines if a U-reset has been activated and if it is allowed. If yes, program control passes to step (316) where the alert is reset and the user-reset-count adjusted and program control returns to the main routine. If a subsequent execution of the main routine does not detect the same flow condition that caused a previous alert to be activated, the alert flags may be cleared. In addition, it should be appreciated that for some embodiments, a U-reset may reset the alert and the variables defining an alert condition (such as flags) (basically canceling the alert). For other embodiments, a U-reset may only suspend an alert for a predefined period of time.

IF at step (314) the answer is NO, program control passes to step (318) where it is determined if an O-reset has been requested. An "O-reset" is an owner reset or an electronic reset. Such resets are considered to be automatically allowed. An O-reset may be activated using the appropriate reset switch as described above. Alternatively, an O-reset may be preprogrammed into the device to automatically request a reset based on predefined conditions. For example, if it has been determine that the flow condition has been corrected where such flow condition had caused a previous alert to be issued, such alert may be reset by the FD device.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A flow detection device for detecting flow associated with a fluid source, said flow detection device comprising:
   a processor enclosed by a housing configured for being associated with a fluid source;
   a memory that is one of (a) electrically associated with said processor and (b) integral to said processor, wherein said memory is configured to store data representing alert-criteria and flow-criteria;
   a flow sensor electrically associated with said processor and disposed within said housing at a position to allow said flow sensor to detect at least one of (a) fluid flow through said fluid source and (b) fluid flow in a fluid source;
   an environment sensor electrically associated with said processor and mechanically associated with said housing and configured for generating environment sensor signals related to an environmental parameter;
   an alert-generator mechanically associated with said housing wherein said alert-generator is at least one of (a) a sound generator electrically associated with said processor and configured for generating a sound based alert and (b) a visual signal generator electrically associated with said processor and configured for generating a visual based alert;
   wherein said processor is configured for using said flow sensor and said flow-criteria to detect a predefined flow condition; and
   wherein said processor is further configured to activated said alert-generator according to said alert-criteria for a detected flow condition.

2. A flow detection device for detecting flow as in claim 1, wherein said memory is further configured to store reset-criteria and wherein said flow detection device further comprises a first reset device associated with said housing and electrically associated with said processor and wherein said first reset device is configured for generating a first reset signal when actuated and wherein said processing device is configured to use said first reset signal and said reset-criteria to perform a task defined by said reset-criteria.

3. A flow detection device for detecting flow as in claim 2, wherein said flow detection device further comprises a second reset device disposed within said housing electrically associated with said processor and wherein said second reset device is configured for generating a second reset signal when actuated and wherein said processing device is configured to use said second reset signal and said reset-criteria to perform a task defined by said reset-criteria.

4. A flow detection device for detecting flow as in claim 3, wherein said fluid source is a household water pipe and wherein said housing further comprises at least one arm for mechanically associating said housing with said water pipe.

5. A flow detection device for detecting flow as in claim 4, wherein each of said at least one arm is configured for allowing said housing to be associated with said water pipe without interrupting the water supply.

6. A flow detection device for detecting flow as in claim 4, wherein said flow detector is an acoustic sensor configured for hearing flow through said water pipe.

7. A flow detection device for detecting flow as in claim 6, wherein said flow-criteria comprise (1) continuous flow event criteria and (2) a periodic flow event criteria.

8. A flow detection device for detecting flow as in claim 7, wherein said water pipe is the supply line for a toilet.

9. A flow detection device for detecting flow as in claim 8, wherein said periodic flow event criteria requires detecting water flow at least once every hour during a 24 hour period.

10. A flow detection device for detecting flow as in claim 8, wherein said continuous flow criteria requires detecting continuous flow for 7 minutes.

11. A flow detection device for detecting flow as in claim 1, wherein said alert-criteria comprises continuous-flow criteria and periodic-flow alert criteria.

12. A flow detection device for detecting flow as in claim 11, wherein said periodic-flow alert comprises (a) activating said visual signal generator to generate a flashing light signal, (b) activating said sound generator to generate a sound based alert, and (c) wherein said environment sensor is a light sensor and wherein said environment sensor is detecting predefined level of light before said sound based alert is activated.

13. A flow detection device for detecting water flow through a toilet, said flow detection device comprising:
- a processor enclosed by a housing configured for being associated with at least one of (a) a toilet bowl and (b) a toilet tank;
- a memory that is one of (a) electrically associated with said processor and (b) integral to said processor, said memory configured to store alert-criteria and flow-criteria;
- a flow sensor electrically associated with said processor, said flow sensor suitably associated with said housing to allow said flow sensor to detect fluid flow through at least one of said toliet bowl and said toliet tank;
- an alert-generator comprising at least one of (a) a sound generator electrically associated with said processor and configured for generating a sound based alert and a visual signal generator electrically associated with said processor and configured for generating a visual based alert;
- wherein said processor is configured for using said flow sensor and said flow-criteria to detect a predefined flow condition; and
- wherein said processor is further configured to activated said alert-generator according to said alert-criteria for the detected flow condition.

14. A flow detection device for detecting water flow through a toilet as in claim 13, further comprising a first reset device electrically associated with said processor and configured for generating a user-reset reset according to reset-criteria stored in said memory.

15. A flow detection device for detecting water flow through a toilet as in claim 13, further comprising a second reset device electrically associated with said processor and configured for generating an owner-reset according to reset-criteria stored in said memory.

16. A flow detection device for detecting water flow through a toilet as in claim 13, wherein said flow-criteria includes a flow condition where water flow through said toilet is detected at least once during a predefined time interval for at least one of (a) a predefined number of consecutive intervals; and (b) a predefined-number-of-intervals during a predefined period of time.

17. A flow detection device for detecting water flow through a toilet as in claim 13, wherein said predefined time interval is 7 minutes, said predefined number of consecutive intervals is 10, said predefined-number-of-intervals is 10 and said predefined period of time is 24.

18. A flow detection device for detecting water flow in a water supply line associated with a toilet, said flow detection device comprising:
- a processor enclosed by a housing, wherein said housing comprises at least one arm for mechanically associating said housing with said water supply line and wherein said processor is configured to track time to determine time-data;
- a memory that is one of (a) electrically associated with said processor and (b) integral to said processor, said memory configured to store alert-criteria and flow-criteria and wherein said alert-criteria includes time-criteria;
- a microphone electrically associated with said processor via an amplifier circuit, said microphone disposed in said housing so that said microphone is substantially adjacent to said water supply line;
- an alert-generator comprising at least one of (a) a sound generator electrically associated with said processor and configured for generating a sound based and (b) a light generator electrically associated with said processor and configured for generating a light based alert;
- wherein said processor is configured for using said microphone to listen for water flow though said water line to generate flow-data, said processor further configured to use said flow-data and said flow-criteria to detect a predefined flow condition; and
- wherein said processor is further configured to activated said alert-generator when said time-data satisfies said time-criteria.

19. A flow detection device for detecting water flow in a water supply line associated with a toilet as in claim 18, further comprising a first reset device electrically associated with said processor and configured for generating an user-reset.

20. A flow detection device for detecting water flow in a water supply line associated with a toilet as in claim 19, wherein said flow-criteria comprise (1) continuous flow event criteria and (2) a periodic flow event criteria.

* * * * *